US010066554B2

(12) United States Patent
Casamassima

(10) Patent No.: US 10,066,554 B2
(45) Date of Patent: Sep. 4, 2018

(54) KIT FOR THE REALIZATION OF A DUAL LPG/PETROL FUEL SYSTEM FOR OUTBOARD ENGINES FOR MOTORBOATS

(71) Applicant: Marco Casamassima, Copertino (IT)

(72) Inventor: Marco Casamassima, Copertino (IT)

(73) Assignee: MARCO CASAMASSIMA, Copertino (LE) (IT)

( * ) Notice: Subject to any disclaimer, the term of this patent is extended or adjusted under 35 U.S.C. 154(b) by 179 days.

(21) Appl. No.: 14/897,625

(22) PCT Filed: Jun. 16, 2014

(86) PCT No.: PCT/IB2014/062261
§ 371 (c)(1),
(2) Date: Dec. 10, 2015

(87) PCT Pub. No.: WO2014/203145
PCT Pub. Date: Dec. 24, 2014

(65) Prior Publication Data
US 2016/0160766 A1  Jun. 9, 2016

(30) Foreign Application Priority Data

Jun. 19, 2013 (IT) .............................. LE2013A0009

(51) Int. Cl.
*F02D 19/06* (2006.01)
*F02M 21/02* (2006.01)
(Continued)

(52) U.S. Cl.
CPC ........... *F02D 19/06* (2013.01); *B63H 20/001* (2013.01); *F02D 19/066* (2013.01);
(Continued)

(58) Field of Classification Search
CPC .. F02D 19/06; F02D 19/0647; F02D 19/0678; F02D 19/066; F02M 21/06; F02M 21/0239; B63H 20/001
See application file for complete search history.

(56) References Cited

U.S. PATENT DOCUMENTS 6,319,080 B1  11/2001  Watanabe et al.
6,601,389 B1   8/2003  Di Gennaro et al.

FOREIGN PATENT DOCUMENTS

DE         9202573 U1   4/1992
EP         2503128 A1   9/2012
(Continued)

*Primary Examiner* — Jacob Amick

(57) ABSTRACT

The present invention relates to a kit for an LPG fuel for petrol run engines and in particular, a kit of electronic and hydraulic components for the realization of a dual fuelling LPG/petrol system (100) particularly suitable for outboard engines of boats navigating in waters with high salt content. Said kit includes a tube-bundle heat exchanger (10) and a pressure regulator (20) separated one from the other and made of antioxidant materials and devices. The heat exchanger (10) is provided at its end with two respective sacrificial anodes (12*b*, 11*b*) for the protection from corrosive galvanic currents and with one temperature sensor (11*c*) placed at one of said ends. The kit also includes a plurality of electrohydraulic LPG injectors (I) and an electronic control unit (CE) set to manage and adjust the operation of such injectors (I), of the pressure regulator (20) and of a plurality of other devices.
Said kit also includes an electronic commutator (SW) set for a bilateral electrical connection with the electronic control unit (CE) and includes a switch for the commutation from one feeding mode (LPG) to another feeding mode (petrol) and vice versa.

14 Claims, 3 Drawing Sheets

Figure 1:
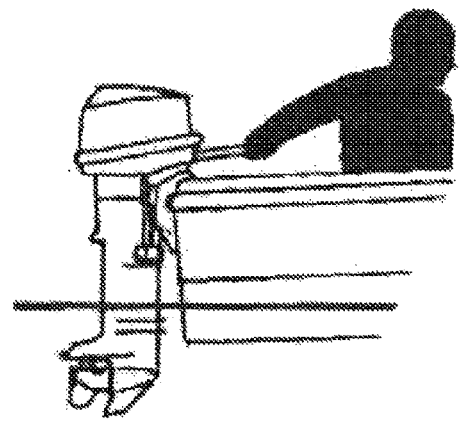

(51) Int. Cl.
    *F02M 21/06*     (2006.01)
    *B63H 20/00*     (2006.01)
    *F02B 61/04*     (2006.01)
    *F02B 69/04*     (2006.01)

(52) U.S. Cl.
    CPC ..... *F02D 19/0647* (2013.01); *F02D 19/0678* (2013.01); *F02M 21/0239* (2013.01); *F02M 21/06* (2013.01); *F02B 61/045* (2013.01); *F02B 69/04* (2013.01); *Y02T 10/32* (2013.01); *Y02T 10/36* (2013.01)

(56) References Cited

FOREIGN PATENT DOCUMENTS

| | | |
|---|---|---|
| JP | H11270996 A | 10/1999 |
| WO | 02/090750 A1 | 11/2002 |

KIT FOR THE REALIZATION OF A DUAL LPG/PETROL FUEL SYSTEM FOR OUTBOARD ENGINES FOR MOTORBOATS

The present invention relates to a kit for the LPG fuel supply of petrol fuelled engines, in particular it refers to a kit of electronic and hydraulic parts to be deployed in a dual fuel supply system LPG/petrol for inboard and outboard motors of motorboats.

In particular, the invention relates to an kit for the realization of a LPG fuelling system set up for the implementation both on engines designed with a LPG/petrol dual fuelling system and on engines fuelled only on petrol and that can be modified through the conversion of the fuelling system, such conversion being made by the driver who can choose on which fuel (LPG or petrol) the motorboat shall run.

The invention, realized in such a way that it can efficiently operate over time in sea water with high salt concentration, aims to protect from corrosion all the hydraulic elements, that come into contact with water, and to supply a highly efficient and functional LPG/petrol hybrid system. As it is known, an outboard engine is a sea engine made to be mounted on the transom of medium and small size boats. Generally, it consist of a two- or four-stroke internal-combustion engine fuelled by petrol or diesel, although there have also been electric powered engines on the market, for some years now. The most common motors are the internal combustion ones in particular, the two-stroke motors, but the four-stroke motors are widely popular as well. The power of such motors varies from a minimum of 4 HP (horses) to a maximum real power of 350 HP. The design of an outboard motor substantially differs from any other common engine as it has a vertical built with the propeller sited in the upper part, being this propeller joint through a transmission shaft and a gear to the screw propeller, whereas the lower part is equipped with a fin called "skeg". The whole system is grouped in an self-contained unit inside an especially shaped top cowling.

In general, the internal-combustion outboard motors are of the petrol or diesel fuelling type. Anyway, many models also fuelled with LPG have been introduced onto the market since many years and an increasing numbers of petrol fuelled motors are modified specifically to run on a dual fuelling LPG/petrol system. The increasing popularity of outboard motors with dual LPG/petrol fuelling systems either modified by the manufacturer or subsequently by the end user, comes from the many advantages offered by LPG, if compared to other fuels as taught by the automotive sector. In particular, the LPG (Liquefied Petroleum Gas) derives from the refining of crude oil, it is composed of a mixture of hydrocarbons, mainly propane and butane. It is a gas and therefore its components are gaseous at normal temperature and pressure, but readily liquefy by compression at moderate pressures, between 2 and 8 bar. In the liquid state, being their volume reduced, they are easily movable. The resulting advantage is to obtain a density of the mixture that is 250 times lower than its density in the gaseous state. The volume is so reduced, but the mass and the quantity of energy that can be produced remain the same.

This method allows the use of pressure containers of relatively reduced size, in particular, a LPG container may hold three times the weight of methane of the same volume, therefore the energy LPG can supply, is three times higher than that one that can be obtained with methane. Moreover, LPG is an easy-to-find fuel, with a low impact on environment. It is also considered the cleanest energy sources as it does not pollute the ground, the water and the groundwater and helps keeping air cleaner. We can therefore say that LPG is considered an environment-friendly fuel. It must also be noted that a vehicle with a LPG fuelling system shows an important reduction of $CO_2$ emissions (20%) and of CO emissions (about 35%) with respect to the traditional gasoline fuelled motors. The increasing popularity of LPG in the automobile sector and for the fuelling of other types of internal combustion engines is generally deriving not only from the above mentioned advantages, but to its chemical characteristics, as well. Actually, LPG shows high energy and heating performances that can be compared to those ones of a gasoline fuelled engine, but at a considerably lower cost with respect to gasoline and to diesel. The advantage being to save up to 50-60% on the fuel cost with the same kilometers travelled if the LPG fuelling system is mounted on the motor. Moreover, a system that runs on LPG will not wear out as it happens in most cases for a normal gasoline or diesel fuelled motor, it will not release carbonaceous and oily residues and the motor shall maintain the lube oil and spark plugs more efficient in time requiring by consequence less maintenance. Further advantages of a dual LPG/petrol fuelling system, even more important in an outboard engine, are the lower noise emissions when running on LPG and the double autonomy due to the presence of two tanks. The only additional expense, widely justified, is therefore represented by the initial design or installation and by the substitution of the tank after 10 years from its testing.

Moreover, any incentive in favor of eco-friendly apparatuses shall be detracted, where applicable, for the transformation of gasoline fuelled vehicles into LPG fuelled vehicles or for the purchase of new vehicles having a standard-mounted LPG system. As may he seen, the advantages offered by the utilization of motors with dual LPG/gasoline fuelling systems are obvious. Anyway, even if on the automotive market this dual fuelling system is quite renown since years, in the outboard engines market, its diffusion has been till now limited by different factors mainly relevant to technical problems that can be faced in the specific sector. More in details, the LPG system in the outboard engine, in particular those ones utilized on marine vessels, are subject to important corrosion phenomena that are not encountered in normal motors utilized on vehicles or on motor boats navigating in fresh water. These phenomena are caused by water and in particular by the sea water that, as it is known, drastically accelerates the oxidation process affecting steel structures. This happens not only for the normal corrosion chemical process, but also for the galvanic currents that generate in metals exposed to an electrolytic environment and that cause the loss of electrons. The existing LPG fuelling systems, including those ones designed for outboard motors, utilize a single component called "pressure regulator" (indicated as P in FIG. 2) that embodies the two functions of heat exchanger (vaporizer) and pressure regulator of the LPG fuel before it is supplied to the injectors and afterwards to the motor intake manifolds. The obvious advantage of having a single device for the control and handling of the LPG flow from the tank to the motor through the fuel supply circuit becomes void due to the fact that despite it occupies a lower volume with respect to the two components taken separately, it presents a reduced versatility as to its positioning and to the space management in the gasoline motors to be modified. Moreover, another disadvantage for the sector of outboard motors for motorboats is the erosion caused by the passage of salty water within the exchanger, including the pressure reducer, that requires the periodical substitution of the whole component even if the regulator is still in good working order and perfectly efficient. As a consequence, there are high replacing and maintenance costs entailed and, in some cases, a severe difficulty for the installer in finding a suitable location for the component inside the top cowling of a motor which fuelling system has to be modified. In consideration of the above, it results that if on one side there are important reasons, technical and environmental advantages in favor of the implementation of LPG fuelling systems, on the other side it is clear that there are the above mentioned hindrances of the actual state-of-the-art that must be overcome in order to streamline performances and make the most of all the advantages deriving from an LPG fuelling system in outboard motors.

The present invention aims to provide a kit for the realization of an enhanced LPG fuelling system, suitable for outboard and running on gasoline.

The purpose of the present invention is to provide for a kit of electronics and mechanical components and in particular to provide for an efficient and functional LPG fuelling system featuring a high reliability and long life cycle.

A further purpose of the present invention is to provide for a technical solution allowing to realize an LPG fuel supply system that can operate in highly salty environments without being affected by the corrosion processes.

The present invention also aims to provide an kit for the realization of an LPG fuelling system, suitable for outboard motors, featuring a heat exchanger and a pressure regulator, advantageously separated and able to operate in a completely autonomous and independent manner.

A further purpose of the present invention is to provide for an LPG fuelling system that can be easily implemented.

Another purpose of the present invention is to provide a kit for the realization of an LPG fuelling system that implements technical solutions that also are economically advantageous and that make the realization of LPG fuelled outboard engines easier being the latter less noisy, more durable and showing a lower fuel consumption and a lower impact on the environment.

These purposes and so many others are practically obtained by a kit for an LPG fuelling system according to the present invention.

Further features and advantages will be more clear in the enclosed pictures where:

FIG. 1: shows a section depicting an example of boat with an outboard motor.

Figure 2:
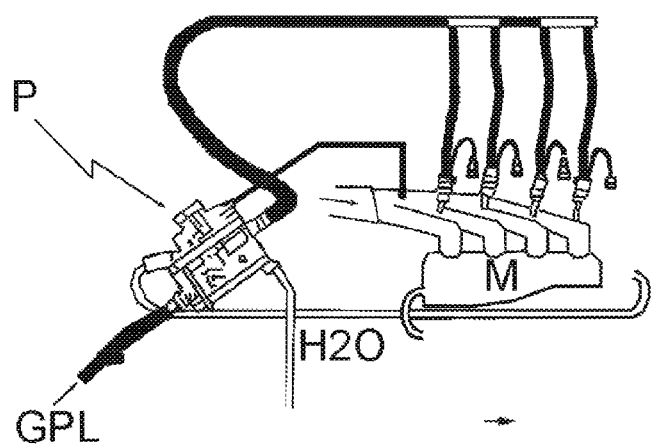
Figure 3:
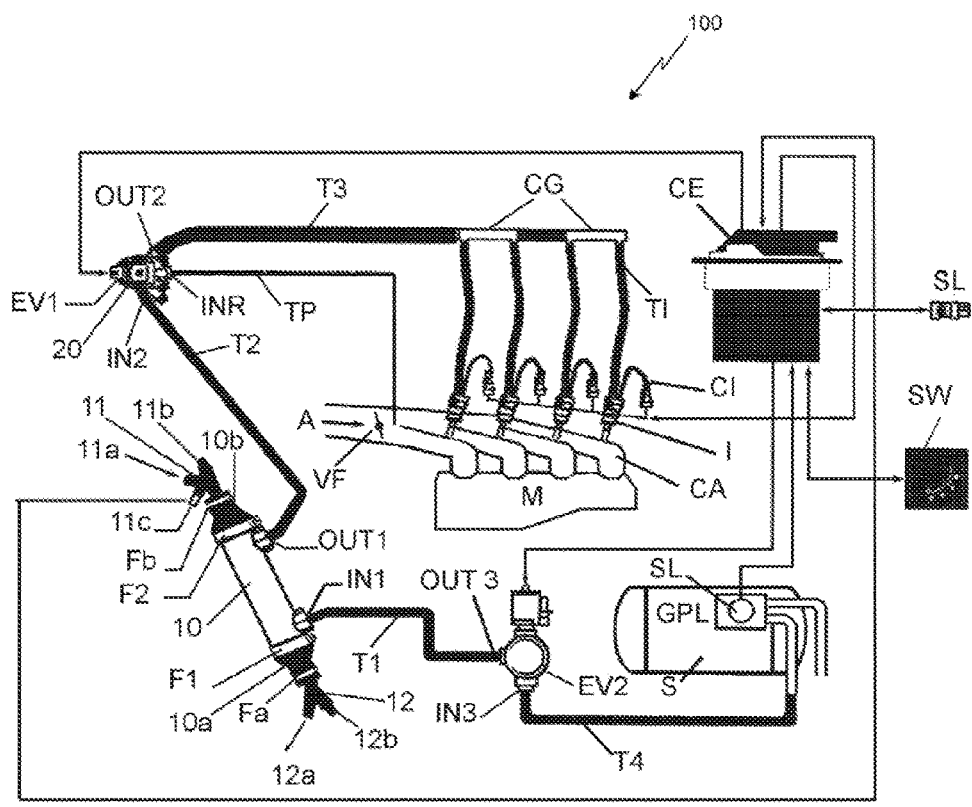
Figures 4A, 4B:
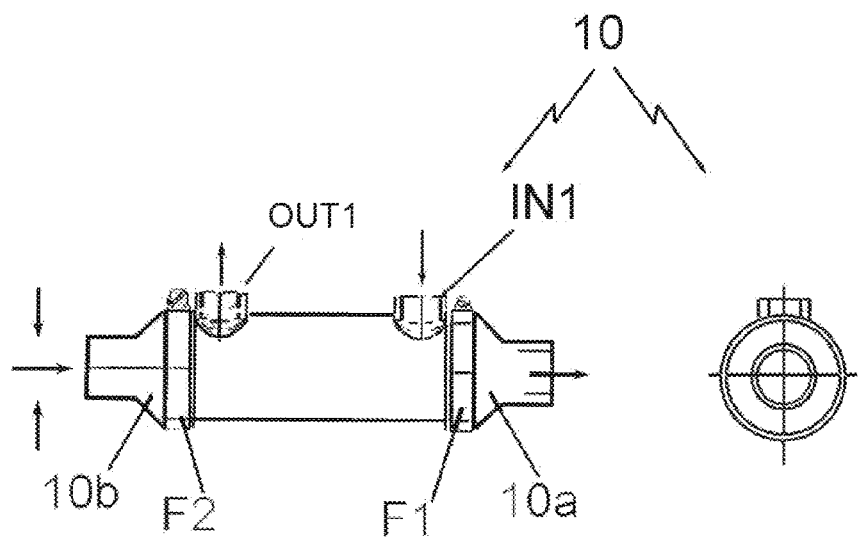
Figure 5:
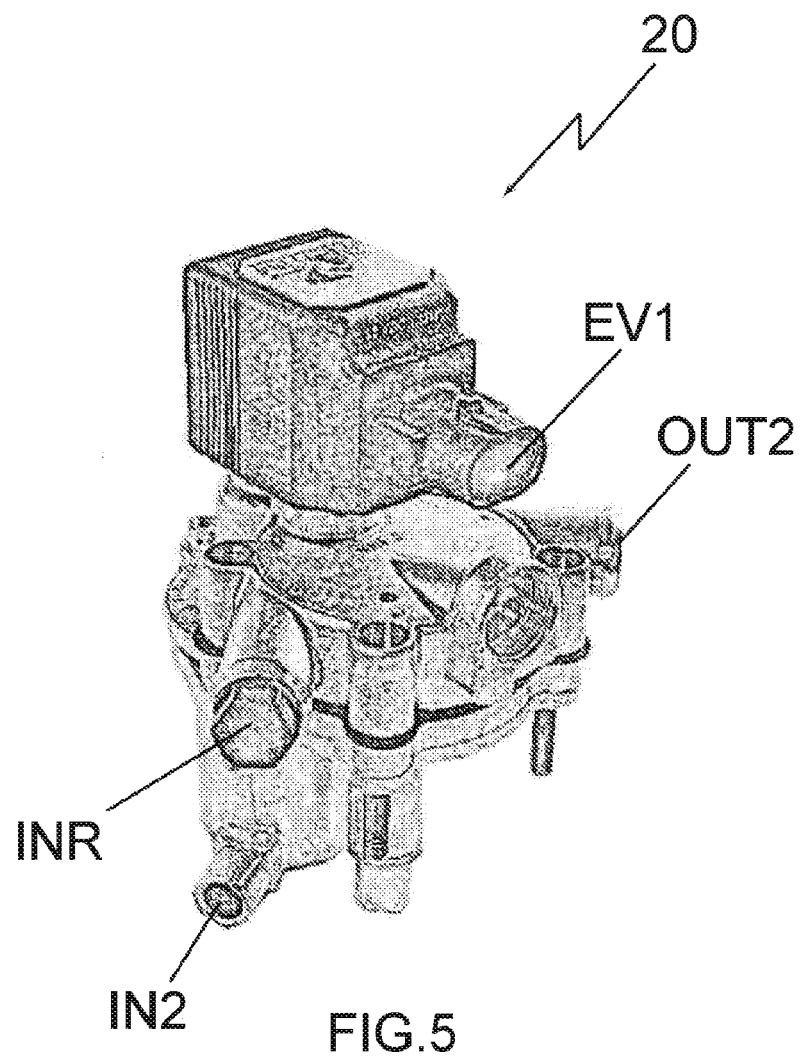

FIG. 2: represents the simplified schematic of a LPG fuelling system for outboard motor according to the prior art, said system includes a "pressure regulator" (P);

FIG. 3: depicts a LPG fuelling system for outboard motors (100) that includes the kit object of the present invention;

FIGS. 4a and 4b: show in details a front and side view of the outer structure of an heat exchanger (10) in accordance with the object of this invention;

FIG. 5: shows a possible way to realize a pressure regulator (20) according to the invention. The kit for the realization of an LPG fuelling system for outboard motors that is the object of the present invention and that is depicted in the Figures previously mentioned, represent an important solution, for the marine sector in particular, to all the problems and hindrances set out in the previous paragraphs.

As information and not limited to it, a preferred realization of the invention is here depicted and described.

In particular, with reference to the drawings of above said FIGS. 3, 4 and 5, the kit, object of the invention relevant to the realization of a dual LPG/petrol fuelling system (100) for outboard motors, includes:

a tube-bundle heat exchanger (10) having a cylindrical body in metal alloy provided with:
a first end engaged by a first rubber cap preferably flared (10a) and such first cap comprising an output plastic element (12) provided with an output mouthpiece (12a) and a first sacrificial anode (12b);
A second end engaged by a second rubber cap preferably flared (10b), such second cap comprising an input plastic mouthpiece (11) provided with a input mouthpiece (11a) for receiving a predetermined water flow from a head of a two- or four-stroke system combustion engine (M); said output mouthpiece (12a) being set to the discharge of said predetermined water flow through said heat exchanger (10);
An input (IN1) for receiving a high-pressure LPG fuel flow to be heated, placed along an outer surface of the said cylindrical body, in proximity of the first cap (10a).

The heat exchanger (10) performs an heat exchange from said predetermined water flow to the high-pressure LPG fuel flow, the latter flowing over a tube-bundle contained in the heat exchanger (10), heating up and expanding. Such tube-bundle is crossed by the said predetermined water flow and is comprised between said input mouthpiece (11a) and said output mouthpiece (12a);
An output (OUT1) for the delivery of an expanded and heated LPG fuel flow, placed along the outer surface of said cylindrical body, in proximity of said second cap (10b) and in correspondence with said input (IN1); said heat exchanger (10) preferably being externally made of brass while said internal tube-bundle being preferably made of cupro-nickel.

The kit, object of the invention, also includes a pressure regulator (20) provided with:
a first input (IN2) set to receive said heated and expanded LPG fuel flow coming from the output (OUT1) of said heat exchanger (10);
An output (OUT2) set to discharge a low pressure LPG fuel flow;
A second input (INR) set to be connected to a pressure manifold of said internal combustion engine (M);
A solenoid valve (EV1) for automatically controlling the opening and the closing of said low pressure LPG fuel flow;
said solenoid valve (EV1) being controllable through a predetermined electrical signal and said pressure regulator (20) preferably made of brass.

Advantageously, the heat exchanger (10) and the pressure regulator (20) are two separate, distinct and independent elements; in particular, the input plastic element (11), included in the second rubber cap (10b) of said heat exchanger (10), comprises a second sacrificial anode (11b) and a temperature sensor (11c). The first and second sacrificial anode (12b, 11b) being preferably defined by two anodes respectively, said anodes being made of zinc or magnesium and preserving said heat exchanger (10) from the galvanic currents that are produced by the water within; said heat exchanger (10) and the pressure regulator (20) are therefore practically immune to salt corrosion, they can easily be placed occupying very little space inside a top cowling of an internal combustion engine (M). The kit also includes, according to the invention, at least four electrohydraulic injectors for LPG fuel (I), each of said injector is provided with a jet dispenser and with an electrical connector (CI), the latter being set to receive an electronic signal for controlling the activation of an LPG spray, of predetermined intensity and duration, within the respective intake manifold (CA) of said engine (M) through the activation of said dispenser. Such activation entails the spraying of a predetermined amount of said low- pressure LPG fuel flow. Each of said injectors (I) is set for the insertion and the fitting on a respective intake manifold (CA) of the engine (M) and for the connection, through a flexible thermoplastic pipe (TI), with an output of a LPG convoy manifold (CG) to receive the said low-pressure LPG fuel, being the latter vaporized and ready to be injected in the respective intake manifold of each of the above mentioned injectors (I). The kit also includes an electronic control unit (CE) provided with a central processing unit, programmed to detect and manage continuously the operating conditions of said engine (M) in an optimal way. The electronic control unit (CE) is set to electrically connect to a plurality of sensors, switches, transducers and actuators and to adjust the operating of said at least four injectors (I) via said electronic control signal generated by the said central processing unit, according to predetermined programming parameters. Said above mentioned sensors also include the temperature sensor ($11c$) of said input plastic mouthpiece (11) and said electronic control unit (CE) being provided with an electronic connector (SL) for the exchange of data and for the reprogramming of functions and parameters with an electronic processor, an in particular with a computer. The kit is also provided with an electronic commutator (SW) set for a bilateral electric connection with above said electronic control unit (CE) and including a switch for the activation and the deactivation of a feeding mode from petrol to LPG and vice versa. Said commutator (SW) includes at least one LED indicating the commutation from one feeding mode (LPG) to another (petrol) respectively, at the end of a predetermined transient that begins from the switching- on of said switch or button.

According to the present invention in the whole, the assembly, object of the present invention also includes at least four electrohydraulic petrol injectors, each of said injectors being provided with its own jet dispenser and with an electric connector, being said connector set to receive a control signal for the activation and adjusting of a petrol spray within the respective intake manifold (CA), corresponding to the said intake manifold (CA) of said engine (M) through the activation of said dispenser. Said control signal is generated from an electronic control unit (CE), that emulates a control signal produced by an electronic control unit for petrol injectors other than the electronic control unit (CE) according to the above mentioned predetermined programming parameters. As to the LPG fuelling system in the whole, although it is independent, the start off of the engine is made with the engine fuelled by petrol and the subsequent passage from petrol to gas requires a variable timeframe that ranges from a predetermined minimum value to a predetermined maximum value depending on the temperature of the engine and the water. This depends on the fact that for injecting LPG in said intake manifolds (CA) of the engine (MA), said LPG fuel shall be vaporized, according to what said with reference to said heat exchanger (10) and pass from the liquid state to the gaseous state. This process is implemented in the outboard motor systems by utilizing the cooling open-circuit thermal exchange circuit of the engine, i.e. without blow-by, by drawing the water from underneath the boat by means of an electric pump that sucks it at a speed that is directly proportional to the revolutions of the engine itself. In particular, the drawn water passes through special ducts of the engine, cooling it off and in turn heating itself up forming said predetermined water flow and then being conveyed to the input mouthpiece ($11a$) of said heat exchanger (10), coming out from the output mouthpiece and finally being poured into the water coming out from the output mouthpiece ($12a$) of the exchanger itself (10). This process has the double function of cooling the engine off and heating the LPG up so that a predetermined temperature threshold is reached for allowing the LPG fuelling commutation of the engine and this is obtained thanks to a thermal transfer with said water flow being obtained through said heat exchanger (10). More specifically as to the purpose of the kit object of the invention in its whole, in said LPG fuelling mode, the switch of said commutator (SW), after being manually triggered, sends a signal to the electronic control unit (CE) to open a solenoid valve (EV2) to allow the passage through a thermoplastic rubber tube (T1) of the said high-pressure LPG fuel flow coming through a thermoplastic pipe (T4) from a tank (S), into the input (IN1) of said heat exchanger (10). Said tank (S) is preferably provided with a level sensor (SL) for sending a signal indicating the quantity of the LPG fuel left to the said electronic control unit (CE). At the same time, at least one indication LED of the commutator (SW) blinks at a predetermined frequency, till the temperature sensor ($11c$) of said input plastic element (11) indicates to the electronic control unit (CE) that the temperature of said predetermined water flow is higher than a predetermined initial temperature, in particular, than 36° C., such being the case, the same electronic control unit (CE) communicates a change of state to the commutator (SW) and at least one indication LED stops blinking and remains on. Therefore, the electronic control unit (CE) activates a fuel feeding exchange from petrol to LPG, in particular by disabling said at least four petrol injectors by activating the solenoid valve (EV1) of said pressure regulator (20); the latter, by means of a thermoplastic rubber tube (T2) positioned upstream, allows the passage of said expanded and heated LPG fuel flow coming out at low pressure from the output (OUT2) of the same regulator (20) into another thermoplastic rubber tube (T3) that is connected to an input of said LPG convoy manifold (CG). The said LPG low-pressure fuel flow is conveyed inside said LPG convoy manifold (CG), and said electronic control unit (CE) adjusts the opening of said LPG injectors (I) with the same timing of said petrol injectors. The input (INR) of the pressure regulator (20) is connected to the pressure manifold of said internal combustion engine (M) by means of a respective thermoplastic pipe (TP); with regards to said pressure manifold, the latter provides a pressure reference to said regulator (20) to compensate for the pressure difference between said heated and expanded LPG fuel flow and the same pressure manifold. The above is necessary so that the injection pressure of the LPG fuel supplied by means of injectors (I) can vary depending on the pressure that is inside an intake group (A) that includes a throttle valve (VF), the latter adjusting the quantity of air fed to a plurality of intake manifolds of said engine (M). In particular, to each of the said injectors (I) correspond the said respective manifold (CA) included in the plurality of manifolds of said intake group (A). With reference to connections in particular, the first rubber cap ($10a$) that engages the first end of the heat exchanger (10) is fixed to the same said end by fixing means (F1, Fa), preferably defined by two steel clamps having a predetermined diameter. The second rubber cap ($10b$) that engages the second end of said heat exchanger (10) is fixed to the latter end by fixing means (F2, Fb) preferably defined by two steel clamps having a predetermined diameter. Preferably, the equipment also includes one alarm sensor in case of any LPG leakage. The above mentioned sacrificial anodes, advantageously two in number, mounted at the end of the said heat exchanger (10) preserve it from perforations caused by cavitation wear and by galvanic currents. The otherwise unavoidable perforation of the heat exchanger (10) would cause the leakage of LPG into the sea from the engine, being said leakage not dangerous as it takes place outside the boat, but consequently compromising the LPG equipment. As first embodiment, said kit is applied to outboard motors with petrol native fuelling system that can be converted into dual fuelling system motors with LPG.

In such a case, besides the said electronic control unit (CE) there is another control unit, that after the conversion of the equipment sends its control signals to said electronic control unit (CE) that, instead of sending it to the at least four petrol injectors, emulates their behavior on petrol fuelling mode.

In a second embodiment, said kit is implemented in the designing of a native dual fuelling LPG/petrol engine. In this case, there is a single electronic control unit (CE) that directly manages the petrol injectors as well, and performs all the management and control function of the whole system.

All the above mentioned systems and elements are meant to be realized with proper marking and/or adequate approvals required for the LPG systems and issued by the Ministry of Infrastructures and Transport or by similar notified Body according to the laws in force in the Country where the invention will be utilized.

The kit object of the present invention is advantageously applicable to any type of two-or four-stroke outboard motors with petrol injection provided that they have a separate lubrication system managed by a separate system allowing the LPG conversion (lubrication with "sprays" or capillary lubrication in the piston rods).

The invention entails important advantages.

The kit, according to the present invention, provides for a highly efficient and functional combination of elements allowing an easy positioning of the same and a streamlined management of the volumes in the engine and making available a system that is practically immune to corrosion and that advantageously requires the least maintenance. In particular, above said devices and components allow the implementation of a double fuelling LPG/petrol system with a control device for the switching from one fuel to the other that gives the solution to the aforesaid problems with reference to the prior art. Moreover, the devices and contrivances mentioned above can be easily implemented at an industrial level as they require technical solutions and technologies that are easy to apply and find on the market.

While the invention is here described under one preferred embodiment which is here given only as information and it is not limited to it, it is clear to the expert ones of the sector that different modifications to the embodiments, shapes, use of the components utilized as well to their combination may be applied without anyway going beyond its scope and purposes.

The materials utilized, provided that they comply with the specific use requirements, can be of any type, according to the needs.

I claim:

1. A kit for a dual LPG/petrol fuel system for outboard engines, the kit comprising:
    a tube-bundle heat exchanger having a cylindrical body in metal alloy, the heat exchanger comprising:
        i. a first end engaged by a first rubber cap of predetermined shape, the first rubber cap comprising an output plastic element having an output mouthpiece and a first sacrificial anode;
        ii. a second end engaged by a second rubber cap of predetermined shape, the second rubber cap comprising an input plastic element comprising:
            1. a second sacrificial anode;
            2. a temperature sensor; and
            3. an input mouthpiece for receiving a predetermined water flow from the head of a combustion engine with two or four stroke system,
            wherein said output mouthpiece is set to a discharge of said predetermined water flow through said heat exchanger;
        iii. an input for receiving a high pressure LPG fuel flow to be heated, the input placed along an outer surface of said cylindrical body, in proximity of said first cap, said heat exchanger performing a heat exchange from said predetermined water flow to said high-pressure LPG flow, the high-pressure LPG fuel flow heating and expanding and flowing out of a tubes bundle inside said heat exchanger, said tubes bundle being crossed by said predetermined water flow and between said input mouthpiece and said output mouthpiece;
        iv. a first output for delivering a heated expanded LPG fuel flow, placed along the outer surface of said cylindrical body, in proximity of said second cap and in fluid communication with said input; and
    a pressure regulator comprising:
        i. a first pressure regulator input set to receive said heated expanded LPG fuel flow from the output of said heat exchanger;
        ii. a first pressure regulator output set to discharge a low-pressure fuel flow;
        iii. a second pressure regulator input set to connect to a pressure manifold of said internal combustion engine;
        iv. a solenoid valve for controlling the opening and closing of said low-pressure LPG fuel flow, said solenoid valve being controllable via a predetermined electrical signal, said heat exchanger and pressure regulator being immune to salt corrosion and sized to fit inside a cover of said combustion engine.

2. The kit of claim 1, further comprising at least four electrohydraulic injectors for LPG, each of the at least four electrohydraulic injectors for LPG comprising:
    i. a jet dispenser; and
    ii. an electric connector set to receive a respective control electronic signal charge to implement delivery of LPG spray of predetermined intensity and duration within a respective intake manifold of said engine through activation of said dispenser, said activation resulting in spraying of a predetermined amount of said low-pressure LPG fuel flow, each of said at least four electrohydraulic injectors for LPG being set to the insertion and the fixing on the respective intake manifold of said motor and to the connection, via a flexible thermoplastic tube, with an output of a LPG convoy manifold.

3. The kit of claim 2, further comprising an electronic control unit comprising a central processing unit, the electronic control unit programmed to detect and manage the operating conditions of said engine, said control unit being set to electrically connect to a plurality of electrical components selected from the group consisting of sensors, switches, transducers and actuators, and to adjust the operation of each of said at least four electrohydraulic injectors for LPG via a control electronic signal generated by said central processing unit according to predetermined programming parameters, said control unit having an electronic connector for the exchange of data and reprogramming of functions and parameters with an electronic processor, and in particular with a computer.

4. The kit of claim 3, further comprising an electronic commutator set to a bilateral electrical connection with said control unit, said commutator comprising a switch or button for the activation, and deactivation of a LPG feeding mode, said commutator comprising at least one LED for indicating the switching occurred to said LPG fuel feeding mode at the end of a predetermined transient which begins from the switching-on of said switch or button.

5. The kit of claim 4, further comprising at least four electrohydraulic injectors for petrol, each of the at least four electrohydraulic injectors for petrol comprising:
 i. a jet dispenser; and
 ii. an electrical connector set to receive a control signal charge to implement and adjust delivery of a petrol spray into respective intake manifold of said motor through the activation of said jet dispenser, the control signal being generated by said electronic control unit, the electronic control unit emulating a control signal of an electronic control unit for petrol injectors, according to said predetermined programming parameters.

6. The kit of claim 5, wherein in said LPG feeding mode the switch or button of said commutator being activated, signals to said control unit to open a solenoid valve for allowing the passage in the input of said heat exchanger, through a first thermoplastic pipe, of said high-pressure LPG fuel flow coming, and through a second thermoplastic pipe, from a tank, the at least one indication LED of said commutator flashing at a predetermined frequency.

7. The kit of claim 6, wherein the temperature sensor of said input plastic element indicates to said electronic control unit that the temperature of said predetermined water flow, greater than a predetermined initial water temperature, is at least about 36° C., said at least one indication LED being constantly switched on, said electronic control unit activating a change of fuel feeding from petrol to LPG and in particular disabling said at least four electrohydraulic injectors for petrol and by actuating the solenoid valve of said pressure regulator, the pressure regulator, by means of a third thermoplastic pipe, located upstream, allowing the passage of said heated expanded LPG fuel flow that comes out at low pressure of the first output of the regulator itself in a fourth thermoplastic pipe, the fourth thermoplastic pipe being connected to an input of said LPG convoy manifold.

8. The kit of claim 7, wherein said heated expanded LPG fuel flow coming out of said pressure regulator, is conveyed within at least said LPG convoy manifold, said electronic control unit adjusting the opening of said at least four electrohydraulic injectors for LPG with the same timing of said at least four electrohydraulic injectors for petrol, said second input being connected to the pressure manifold of said combustion engine via a respective thermoplastic pipe, said pressure manifold providing a pressure reference to said regulator to compensate for a pressure difference between said expanded LPG fuel flow coming out of said pressure regulator, and an intake group comprising the respective intake manifold of each of said at least four electrohydraulic injectors for LPG.

9. The kit of claim 1, wherein the first cap is fixed to the first end by a first means, and wherein the second cap is fixed to the second cap by a second fixing means, and wherein the second cap is fixed to the second end by a second fixing means, and wherein said first sacrificial anode and said second sacrificial anode are connected to said engine.

10. The kit of claim 1, wherein an external surface of said heat exchanger is made of brass, and wherein at least an interior surface of said tube bundle is made of cupronickel.

11. The kit of claim 1, wherein, said pressure regulator is made of brass.

12. The kit of claim 1, wherein said first sacrificial anode and said second sacrificial anode are zinc or magnesium anodes configured to preserve said heat exchanger from galvanic currents produced by water inside the heat exchanger.

13. The kit of claim 9, wherein the first fixing means and the second fixing means are respectively defined by two steel clamps with predetermined diameters.

14. The kit of claim 9, wherein the first sacrificial anode and the second sacrificial anode are connected to a metal part of said engine selected from the group consisting of a ground and other sacrificial anodes.

* * * * *